US008316051B1

(12) United States Patent
Burns et al.

(10) Patent No.: US 8,316,051 B1
(45) Date of Patent: Nov. 20, 2012

(54) TECHNIQUES FOR ADDING MULTIPLE SECURITY POLICIES TO A DATABASE SYSTEM

(75) Inventors: Rae K. Burns, Westminster, MA (US); Patrick F. Sack, Ashburn, VA (US); Vikram Reddy Pesati, Foster City, CA (US)

(73) Assignee: Oralce International Corporation, Redwood Shores, CA (US)

( * ) Notice: Subject to any disclaimer, the term of this patent is extended or adjusted under 35 U.S.C. 154(b) by 1998 days.

(21) Appl. No.: 10/006,543

(22) Filed: Nov. 30, 2001

(51) Int. Cl.
*G06F 17/30* (2006.01)
(52) U.S. Cl. .................. 707/783; 707/786; 707/694
(58) Field of Classification Search .................. 707/1, 9, 707/101, 100, 694, 781, 783, 786, 999.009, 707/999.107; 713/165, 193, 200
See application file for complete search history.

(56) References Cited

U.S. PATENT DOCUMENTS

| | | | | | |
|---|---|---|---|---|---|
| 4,962,533 | A | * | 10/1990 | Krueger et al. | 713/193 |
| 5,751,949 | A | * | 5/1998 | Thomson et al. | 713/201 |
| 5,787,428 | A | * | 7/1998 | Hart | 707/9 |
| 5,859,966 | A | * | 1/1999 | Hayman et al. | 707/1 |
| 6,289,462 | B1 | * | 9/2001 | McNabb et al. | 713/201 |
| 6,304,973 | B1 | * | 10/2001 | Williams | 713/201 |
| 6,516,315 | B1 | * | 2/2003 | Gupta | 707/9 |
| 2002/0049903 | A1 | * | 4/2002 | Ussery et al. | 713/165 |
| 2002/0143735 | A1 | * | 10/2002 | Ayi et al. | 707/1 |
| 2003/0088786 | A1 | * | 5/2003 | Moran et al. | 713/201 |

OTHER PUBLICATIONS

Hosmer, Hilary, "*The Multipolicy Model; A Working Paper*", Fourth RADC Database Security Workshop, Little Compton, Rhode Island, Apr. 22-25, 1991, pp. 166-184.
Abrams, Marshall et al., "*Generalized Framework for Access Control: Towards Prototyping the ORGCON Policy*," The MITRE Corporation, Bedford, MA, Oct. 1991.

* cited by examiner

*Primary Examiner* — Leslie Wong
(74) *Attorney, Agent, or Firm* — Hickman Palermo Truong Becker Bingham Wong LLP (57) ABSTRACT

Techniques for managing access to data in a database allow several policies to be applied simultaneously to the same row in a database table, and provide a pluggable module in the form of the database package that allows one or more access control security policies to be added to a common database server without taking the database server off line. Techniques include registering one or more packages of routines with a database management system. An access mediation routine in a first package is invoked for determining whether to allow operation on data in a first table associated with a first policy. Other techniques include, for each operation in an operation set, determining whether to perform the operation on a row of the table based on a set of labels associated with the row. The set of labels correspond to a policy set associated with the table.

10 Claims, 5 Drawing Sheets

TECHNIQUES FOR ADDING MULTIPLE SECURITY POLICIES TO A DATABASE SYSTEM

FIELD OF THE INVENTION

The present invention relates to providing security of data in a database using access controls based on labels associated with a user and with data items in a database. In particular, the present invention is directed to plugging any of multiple, label-based security policies into a database server of a database system without rewriting the database server for each policy.

BACKGROUND OF THE INVENTION

Database systems provide processes for storing and retrieving information on persistent storage devices. Database objects are logical data structures that are used by a database server of a database system to store and organize both data in the database and procedures that operate on the data in the database. For example, in a relational database, a table is a database object with data arranged in rows, each row having one or more columns representing different fields. Another database object is a package of procedures that may be invoked and executed by the database server. In general, a database object includes one or more data items, each data item having values for one or more fields.

The stored information may belong to one or more entities, such as companies, associations and government organizations. In general, the entity that owns the stored information desires that access to the information be limited to particular users or groups of users. The entities often look to the database system to enforce access controls.

Many commercial database systems control access using a log-on procedure that determines authorized users. For example, a user who correctly enters a user identification (user ID) and a password is allowed access as an authorized user. One or more privileges are assigned to each authorized user. A privilege alters a user's access to database objects based on the database operations the authorized user may perform on the database objects. For example, a user may have a privilege that allows the user to read all data in a table but a privilege that does not allow the user to write data to the table. Database operations include data manipulation operations and database definition operations. Data manipulation operations include adding a row, deleting a row, and modifying contents of a row, among others. Database definition operations include adding a table, adding a column to a table, and adding an index for a table, among others. Other database operations include logging on to the database system and establishing a communication session with a database server.

Unfortunately, access controls employed by early commercial database systems did not conveniently satisfy information access control requirements established by some organizations.

For example, a user granted access to the database had access to all tables in the database. This did not support many security policies, such as multi-level security policies. For example, information in a database of military units and their capabilities are subject to a multi-level security policy. The multiple levels include unclassified, confidential, secret, and top-secret. According to this policy, information classified as secret may only be accessed by users who are cleared through the secret level or higher. This data may be viewed by a user cleared through top-secret level but not an unclassified member of the general public or a user cleared through the confidential level. To provide the access control required by the multi-level system using some conventional access controls, data at each level would be kept in a separate database. Placing data in separate databases based on security level duplicates storage, increasing storage space requirements, and greatly decreases efficiency.

One approach to provide the access control required by the multi-level system is to store different level data in different tables of the same database. In some embodiments of this approach, the data tables are stored in separate files with access controlled by an operating system. Placing data in separate tables and files based on security level is still very inefficient.

To increase efficiency, in some database systems, information for several levels are included in a single database object and access controls are applied for each data item in the database object. For example, access controls are applied for each row in a table. The database server of the database system is modified in numerous places to enforce access control for a multi-level security policy at the granularity of individual rows.

A multi-level security policy, with data item granularity, implemented in some later database servers still has some deficiencies. One drawback is that only one security policy is allowed for the database system, yet one security policy does not meet the needs of all users. For example, the multi-level policy does not suit some commercial applications which would control access to corporate data based on a labels associated with the corporation's unique corporate hierarchy. As another example, the multi-level policy does not match file access controls of a UNIX operating system, which allow user, group and world access separately on reading and writing files. Some user may want to apply the corporate hierarchy labels, another user may want to apply the UNIX operating system labels, and a third user may want to apply a combination of both on the same data. Using conventional approaches, three different database servers would be developed to support the three combinations of the two label-based policies.

Another drawback is that any modification to the security policy is implemented as changes to instructions scattered throughout the set of instructions that provide the behavior for the database server. Managing multiple scattered changes of an instruction set is difficult, costly, prone to error, and can result in unanticipated and undesired side effects. For example, programmers responsible for modifying the code of the database server to implement a single change in a security policy may make modifications to seven distinct places in the source code, without realizing that modifications are also required at two other locations. By failing to make changes in all locations, the database server may fail to operate properly, and may even operate in a manner directly contrary to the policy change for which modifications were being made.

In addition, it is desirable for a security policy to be added to an existing database server without taking the database server offline, so that users of a database system are not prevented from continuing to perform database operations. When users find a database system is unavailable, those users often become dissatisfied with that database system, may feel that the database system is unreliable because it is offline, and may decide not to use that database system in future projects.

Based on the foregoing description, there is a need for applying several policies simultaneously to the same data item in the database.

In addition, there is a clear need for a database system that allows one or more access control security policies to be added to a common database server without rewriting the database server.

Furthermore, there is a clear need for a database server that can integrate a new security policy without taking the database server offline, e.g., without making the database server unavailable to users of the database system.

SUMMARY OF THE INVENTION

According to one aspect of the invention, techniques are provided for managing access to data in a database subject to multiple label-based security policies. The techniques include receiving a request within a database management system. The request is for performing an operation set of one or more operations on data in a table of the database. Of the label-based policies, it is determined which policies apply to the table based on a policy set of one or more policies associated with the table. For each operation in the operation set, it is determined whether to perform the operation on a row of the table based on a set of labels associated with the row. The set of labels correspond to the policy set of policies.

According to another aspect of the invention, techniques are provided for managing access to data in a database based on a database policy set of one or more label-based security policies. The techniques include registering one or more packages of routines with a database management system. Each package implements a security model that supports a model set of one or more policies of the database policy set. Each package includes an access mediation routine. A first policy of a first model set in a first package is associated with a first table within the database system. The access mediation routine in the first package is invoked for determining whether to allow operation on data in the first table based on the first policy.

These techniques allow several policies to be applied simultaneously to the same row in a database table.

These techniques also provide a pluggable module in the form of a database package that allows one or more access control security policies to be added to a common database server without taking the database server off line.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for adding one or more security policies to a database system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A generalized framework for access control (GFAC) is convenient for describing multiple security policies. According to the GFAC, all security policies involve access control subjects (such as users, groups of users, and hierarchies of users) and access control objects (such as database objects and data items in a database object). A security policy is described by access control information (ACI), access control context (ACC), access control rules (ACR), and access control authorities (ACA).

Access control information (ACI) includes characteristics of access control subjects and access control objects. Typically, labels indicating ACI are associated with access control subjects and access control objects in a database. Access control context (ACC) includes additional information used in making access control decisions. For example, ACC includes time of day at which access is attempted.

Access control rules (ACR) are a set of formal expressions that determine whether a request from a particular access control subject for a particular access control object is granted. Typically, access control rules include a policy lattice that relates labels to each other. For example, a multi-level security policy may have a policy lattice with top-secret label at the top, a secret label below top-secret, a confidential label below secret and an unclassified label below confidential. A rule would then be expressed so that a subject having a label at one level in the lattice may access objects having labels at the same level or below.

Access control authorities are authorized agents who specify the ACI, ACC and ACR. For example, the ACA are the owners of the data in the data items of the database objects. ACI, ACC and ACA are expressed as sets of one or more attributes. Each attribute has an attribute name and an attribute value.

Functional Overview

According to embodiments of the invention, rows of a database table in a relational database are the access control objects. Stated another way, the granularity of the access control is the row level of tables according to these embodiments. The users of the database, including users of applications that invoke the database server, are the access control subjects. According to embodiments of the invention, each row may be subject to multiple label-based security policies.

According to some embodiments of the invention, the ACR are defined and enforced in a pluggable package of routines registered with the database server and called by the database server. Therefore one server can enforce any policy by plugging in the package that defines the policy and enforces the rules of that policy.

Example Policies

For example, assume four label-based security policies apply to the databases of the database management system. The policies have the labels listed in Table 1, Table 2, Table 3, Table 4, respectively. The first two policies are compartmented policies, the third policy is a multi-level policy, and the fourth policy is a corporate hierarchical policy. In a compartmented policy the label on the object and the label on the subject must match exactly for a subject to gain access to an object. The labels used in the two example compartmented policies are given in the first column of Table 1 and Table 2. In a multi-level policy the label on the data can be at the level of the subject or at a lower level of security for the subject to be granted access. The labels used in the example multi-level policy are given in the first column of Table 3 with higher levels of security following lower levels. In a hierarchical security policy the label on the object must be at the level of the subject or at a lower level on the same branch of the hierarchy for the subject to be granted access. The labels used in the example hierarchical policy are given in the first column of Table 4 with lower levels following higher levels on the same branch.

In some embodiments, the policy uses both a descriptive name label and a policy-specific internal label that is more compact or easier to manipulate than the descriptive policy name, or both. The second columns of Table 1, Table 2, Table 3 and Table 4 give example internal labels. In most policies it is typical for the policy to use an internal label that is numeric as a shorthand representation for the long descriptive names. In a multi-level policy, it is typical to associate a numeric internal label that increases or decreases monotonically with level. In a hierarchical policy it is typical to use a series of number, also called a vector, to distinguish nodes traversed from the root or highest node. Each number in the series corresponds to a lower level of the hierarchy.

The third column of Table 1, Table 2, Table 3 and Table 4 is described in more detail below.

TABLE 1

Labels for A Compartmented First Example Policy

| Descriptive Label | Internal Label | Database Coded Label |
|---|---|---|
| not assigned | 100 | NULL |
| Compartment A | 101 | 1 |
| Compartment B | 102 | 2 |
| Compartment C | 103 | 3 |
| Compartment D | 104 | 4 |
| Compartment E | 105 | 5 |
| Compartment F | 106 | 6 |
| Compartment G | 107 | 7 |
| Compartment H | 108 | 8 |
| Compartment I | 109 | 9 |
| Compartment J | 110 | 10 |

TABLE 2

Labels for A Compartmented Second Example Policy

| Descriptive Label | Internal Label | Database Coded Label |
|---|---|---|
| Alpha | 1010 | 1 |
| Bravo | 1020 | 2 |
| Charlie | 1030 | 3 |
| Delta | 1040 | 4 |
| Echo | 1050 | 5 |
| Foxtrot | 1060 | 6 |
| none | 1999 | NULL |

TABLE 3

Labels for A Multi-level Third Example Policy

| Descriptive Label | Internal Label | Database Coded Label |
|---|---|---|
| unclassified | 1 | 1 |
| confidential | 2 | 2 |

TABLE 3-continued

Labels for A Multi-level Third Example Policy

| Descriptive Label | Internal Label | Database Coded Label |
|---|---|---|
| secret | 4 | 3 |
| top secret | 8 | 4 |
| not assigned | 16 | NULL |

TABLE 4

Labels for A Hierarchical Fourth Example Policy

| Descriptive Label | Internal Label | Database Coded Label |
|---|---|---|
| Corporate | 1 | 1 |
| Corporate, Admin | 1.1 | 2 |
| Corporate, Finances | 1.2 | 3 |
| Corporate, Legal | 1.3 | 4 |
| Corporate, Division A | 1.4 | 5 |
| Corporate, Division A, Denver | 1.4.1 | 6 |
| Corporate, Division A, Dover | 1.4.2 | 7 |
| Corporate, Division A, Dover, Shipping | 1.4.2.1 | 8 |
| Corporate, Division A, Dover, Production | 1.4.2.2 | 9 |
| Corporate, Division A, Dover, Sales | 1.4.2.3 | 10 |
| Corporate, Division B | 1.5 | 11 |
| Corporate, Division B, Sales | 1.5.1 | 12 |
| Not assigned | 0 | NULL |

Multiple Policies on Each Row

Figure 1A:
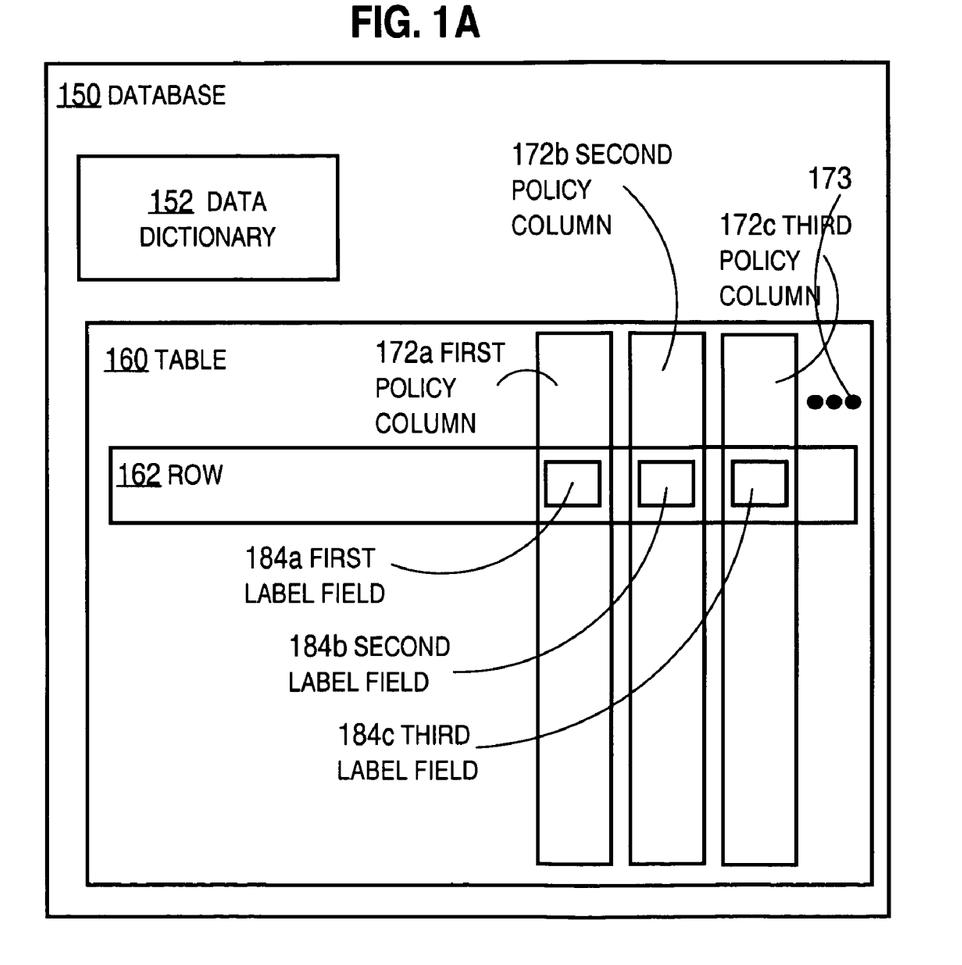
FIG. 1A is a block diagram illustrating a table in a database to which multiple policies apply, according to an embodiment.

FIG. 1A is a block diagram illustrating a table 160 in a database 150 to which multiple policies apply, according to an embodiment. The database 150 includes a database name and a data dictionary 152, which is a data structure holding data that describes the tables in the database and the columns in each table. Information about each column in table 160, such as column name and data type in the column, is kept in the data dictionary 152.

Table 160 includes three policy columns 172a, 172b, 172c, collectively referenced as policy columns 172, which correspond to three security policies that apply to the table. The ellipsis 173 indicates that other policy columns may be included in the table in other embodiments. One policy column 172 is in table 160 for each security policy that applies to table 160.

According to the embodiment of FIG. 1A, each row includes a label field, 184a, 184b, 184c (collectively referred to as label field 184) in each policy column. The label field 184 for each column holds data indicating a value for a label associated with the policy associated with the column. For example, row 162 includes first label field 184a in column 172a for the first security policy. First label field 184a holds data indicating a value for a label of that first policy. For example, if the first policy is the example first policy of Table 1, then first label field 184a can hold a value corresponding to "Compartment H," which indicates the data in row 162 belongs in Compartment H according to the first policy.

Similarly, row 162 includes second label field 184b in column 172b for the second security policy. Second label field 184b holds data indicating a value for a label of that second policy. For example, if the second policy is the example second policy, then the second label field 184b can hold a value corresponding to "Alpha," which indicates the data in row 162 belongs in compartment Alpha according to the second policy.

Similarly, row 162 includes third label field 184c in column 172c for the third security policy. Third label field 184c holds data indicating a value for a label of that third policy. For example, if the third policy is the corporate hierarchy example policy of Table 4, then third label field 184c can hold a value corresponding to "Corporate, Division A, Dover, Sales" indicating the data in row 162 belongs to that node in the hierarchy. A subject belonging to a node of the organization on the line between the root node and that node can access the data in row 162, but subjects below, or on other lines, are not allowed to access the data in row 162.

In some embodiments, neither the descriptive label names of the policy (such as "Compartment H", "Alpha" and "Corporate, Division A, Dover, Sales") nor the policy internal labels (such as "108", "1010" and "1.4.2.3", respectively) are held in the label fields 184 in tables of the database. Instead, a database coded label indicating the label is stored in the label field. The database coded label is often more compact and easier to manipulate than either the descriptive label or the policy internal label. The third column of Tables 1, 2, 3, 4 give example values for the database coded labels. In such embodiments, the database system maintains a map between the coded labels used in the label fields of each policy, and the descriptive name used for the label by the policy itself, or the policy internal labels, or both. For example, Tables 1, 2, 3, 4 may serve as maps of the labels in the database system.

A row 162 including data that belongs in "Compartment H" according to the first policy, belongs in compartment "Alpha" according to the second policy, and is at the "Corporate, Division A, Dover, Sales" node according to the fourth policy, would have values in label fields 184a, 184b, 184c of "8", "1", "10", respectively, using the database coded labels.

According to one embodiment, to obtain access to the data of row 162, a subject should have access under all three policies. If the subject is not allowed access under any of the three policies, the subject is not allowed to access or operate on the data in row 162.

The policies associated with the policy columns 172 may be kept in any manner known in the art. For example, in some embodiments, the descriptions in the data dictionary 152 indicate which columns are policy columns. In some embodiments, each policy is identified by a policy name, and the data dictionary gives the policy name of the policy associated with the policy column. In some embodiments, another table maintained by the database management system keeps a list of policy names of policies that apply to the database. In some embodiments, the column name includes the policy name.

In other embodiments, policies are associated with the table without being columns in the table. For example, a separate table is kept for each policy that lists the tables to which the policy applies.

In other embodiments, labels are associated with a row without being stored in the row. For example, one or more separate tables include the labels of one or more policies in one or more rows, and each row points to a row of table 160 associated with the label.

Pluggable Security Policies Structures

Figure 1B:
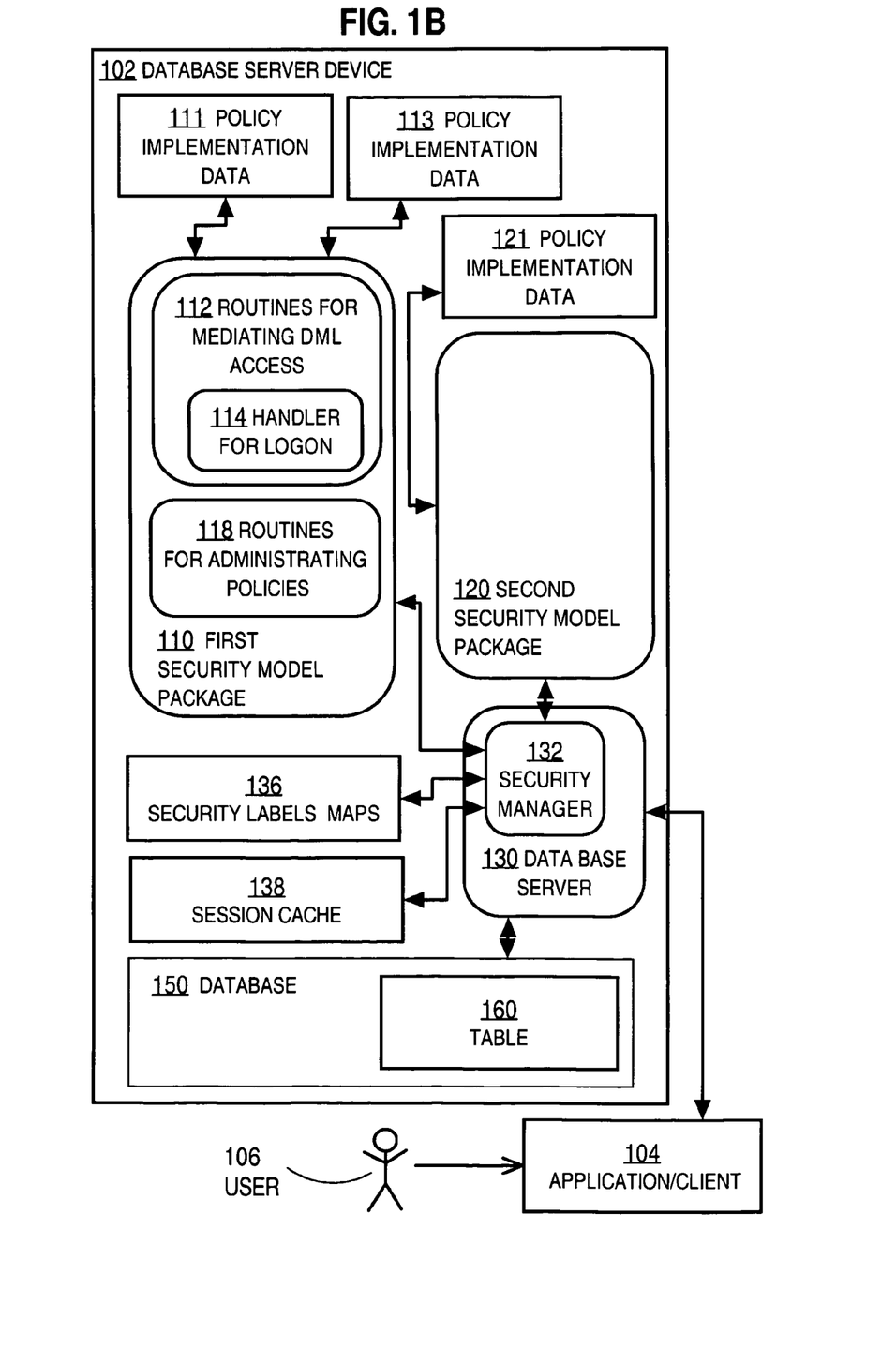
FIG. 1B is a block diagram illustrating a database management system having pluggable security policies, according to an embodiment.

FIG. 1B is a block diagram illustrating a database management system having pluggable security policies, according to an embodiment. As in conventional database management systems, a human user 106 interacts with an application or client process 104 which accesses data in a database through a database server process 130 (database server). For example client process 104 accesses table 160 in database 150 for user 106.

According the embodiment of FIG. 1B, one or more label-based security functions are provided by one or more packages of routines that interact with the database server 130. For example, label-based security functions are provided by security model package 110 and security model package 120. A security manager process, security manager 132, represents processes of database server 130 that interact with the one or more packages.

Different policies that can be enforced by the same enforcing process are herein said to have the same "underlying security model". For example, a compartmented security model requires an exact match of labels for a particular access control subject and a particular access control object in order for the subject to be granted access to the object. The compartmented security model can be used to form a variety of policies with a variety of policy labels. For example, a first policy may include a policy labels for 10 compartments, labeled as in the first column of Table 1. A second policy may include policy labels for six compartments labeled as in the first column of Table 2. The ACR for each policy is based on the same compartmented security model and different values for the number and names of the compartments. A single compartmented-model enforcing process may be written that enforces both the first security policy and the second security policy. Similarly, a single administrative process may be written that implements all compartmented policies.

According to the illustrated embodiments, a different package is formed for each security model to be used by database server 130 in the database management system. For example, security model package 110 is formed for compartmented policies, and security model package 120 is formed for hierarchical policies. In other embodiments, other security model packages are formed for multi-level policies and for policies compatible with the UNIX file access policy and for hybrid policies that combine aspects of one or more of the other policy models.

Each package includes one or more routines 112, called access mediation routines, and one or more routines 118 called administrative routines.

The access mediation routines 112 mediate access to data in a database table for DML operations. The access mediation routines 112 provide the enforcing processes for the security model. The access mediation routines include a routine, called a logon handler 114, to be executed when a user initiates a communication session with the database server 130, either directly through a client process or indirectly through an application. The access mediation routines are described in more detail below with reference to FIG. 3. According to an embodiment, a programming interface is specified for the interaction between the security manager 132 and the access mediation routines. The specified programming interface specifies the routine names that are invoked by the security manager 132 of the database server 130, the semantics and type of data returned from each routine, and the semantics and types for the parameters passed to each routine. This allows independent developers to develop security model packages that can be plugged into the database server 130.

The administrative routines perform administrative functions for the policy model such as creating each policy and managing the labels for each policy. Policy specific information, generated by the administrative routines 118 when each policy is implemented, such as policy name and number and names of labels, are stored in one or more data structures accessed by the package. For example, security model package 110 stores policy information in data structures 111, 112 for the first example policy and the second example policy, respectively. The security model package 120 for hierarchical labels stores policy information in data structure 121 for the fourth example policy. Another security model package for multi-level labels, not shown, stores policy information in another data structure, not shown, for the third example policy. The administrative routines are described in more detail below with reference to FIG. 2. According to some embodiments, a programming interface is also specified for the interaction between the security manager 132 and some of the administration routines 118.

According to the illustrated embodiment, the security manager 132 maintains one or more maps 136 of security labels used by each policy. The maps are data structures used to determine what labels are used in each policy and to translate a label used by the security model package to a database coded label used in database. For example, the maps 136 include the information in Tables 1, 2, 3, 4, above.

Also according to the illustrated embodiment, the security manager places data in a session cache 138 associated with a user 106 for the duration of a communication session between the user 106 and the database server 130. The session cache is a data structure holding data related to the communications session. As described in more detail below with reference to FIG. 3, the data added to the session cache includes a set of allowed labels for that user for every policy. A user is allowed to operate on a row of a table in the database according to one policy if the label for that policy associated with the row is in the allowed set for that policy. In an illustrated embodiment, the set of allowed labels depends on the operation to be performed on the row.

Method for Adding Policies to a Database System

Figure 2:
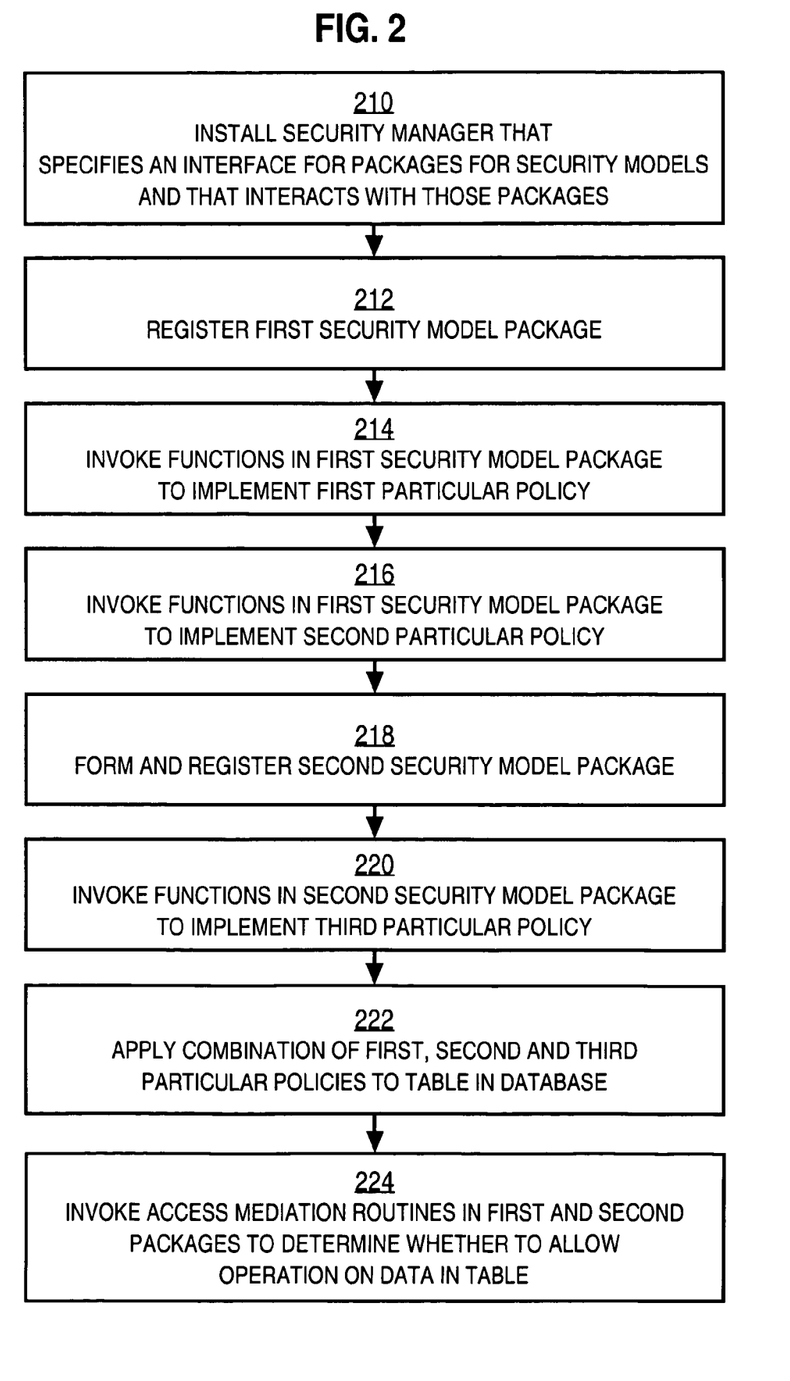
FIG. 2 is a flow chart illustrating at a high level, a method for plugging multiple security policies into a database management system.

FIG. 2 is a flow chart illustrating at a high level, a method for plugging multiple security policies into a database management system. Although steps are shown in FIG. 2 and subsequent flow charts in a particular order, in other embodiments the steps can occur in a different order or can overlap in time. Assume for purposes of illustration that a set of policies to which a database is subject, called herein a database policy set, includes the four label-based security policies listed in Tables 1, 2, 3, 4.

In step 210, a security manager 132 is installed in the database server 130. In some embodiments, the database server 130 is rewritten one time to include a security manager 132, which provides the framework for interacting with one or more packages and other security information. For example the security manager registers the packages, invokes the administrative routines 118 to implement a policy, maintains the security labels maps 136, invokes the access mediation routines 112 using the specified programming interface, and determines the allowed set and places it in the session cache 138.

In step 212 a first security model package is registered with the security manager 132 of the database server 130. In some embodiments, the database security administrator designs and develops the security model package. In some embodiments the security model package is provided by the developer of the security manager 132, or is provided by a third party vendor, so that a database administrator does not have to develop her own package. For example, a security model package 110 that supports a compartmented security model is provided by the developer of the security manager, and the database security administrator registers the package 110 with the database server 130. Any manner known in the art for registering the package at the time the package is registered can be used. For example, the database security administrator types in a name of the file containing the package in a dialog box of a graphical user interface for the security manager 132 of the database server 130.

In step 214, administration routines 118 of the package 110 are invoked to implement a first policy of the database policy set. Any method to invoke the administration functions can be employed. For example, in one embodiment, the security manager 132 invokes an initial routine of the administrative routines. In another embodiment, the database security administrator invokes the routine manually. In another embodiment, the routine is launched by the package itself when the package is registered.

Once invoked, the administration routines to implement the first policy determine a name for the first policy, determine the number of labels, determines descriptive names for the labels, and determines corresponding values for policy-specific internal labels. In some embodiments the database security administrator provides the policy name but other labels are determined based on operating system labels. In some embodiments, the database security administrator provides the descriptive labels as well. The information may be provided in any manner known in the art. For example, the information can be provided as parameters when the administrative routines are invoked. As another example, the information can be provided in response to prompts generated by the administrative routines, such as in a dialog box of a graphical user interface (GUI).

In some embodiments, the database security administrator also provides information about the relationship among the labels, such as the ranking of a label in a multi-level label policy, or a location of a label at a node of a hierarchical label policy. The relationship among labels may be omitted in some security models, such as in a compartmented label policy.

The administration routines to implement the first policy also determine labels for users of the database based on their logon identities. In some embodiments the database security administrator provides the logon identity of each user and the label to be associated with that logon identity.

According to the illustrated embodiment, as each policy is implemented, the policy name and the labels are accumulated in the security labels maps 136 by the security manager 132 of database server 130.

In an example embodiment of step 214, the administrative routines of the compartmented security model package 110, invoked to implement the first policy, determine the descriptive labels and internal labels listed in Table 1, above. The policy name and its labels are accumulated in the security labels maps 136.

In step 216, administration routines 118 of the package 110 are invoked to implement a second policy of the database policy set. For example, the administrative routines of the compartmented security model package 110 are invoked to implement the second example policy by determining the descriptive labels and internal labels listed in Table 2, above. The policy name and its labels are accumulated in the security labels maps 136.

In step 218 a second security model package is formed and registered with the security manager 132 of the database server 130. For example, the database security administrator develops a package, not shown, that supports a multi-level security model. The database security administrator registers the package with the database server 130. As another example, a third party develops a security model package 120 that supports a hierarchical security model. The database security administrator registers the package 120 with the database server 130.

In step 220, administration routines of the other package or packages are invoked to implement additional policy or policies of the database policy set. For example, administrative routines of the multi-level security model package are invoked to implement another policy by determining the descriptive labels and internal labels listed in Table 3, above. As another example, administrative routines of the hierarchical security model package are invoked to implement another policy by determining the descriptive labels and internal labels listed in Table 4, above. The security manager 132 of database server 130 accumulates the policy names and their labels in the security labels maps 136.

In step 222, one or more of the policies of the database set are applied to one or more tables in the database. For example, the policies of Tables 1, 2 and 4 are applied to table 160 of database 150. According to the illustrated embodiment, the security manager 132 of the database server 130 adds three policy columns 172 to table 160, with corresponding information added in the data dictionary 152. Column 172a is added for the compartmented policy of Table 1 managed by the compartmented security model package 110. Column 172b is added for the compartmented policy of Table 2, also managed by the compartmented security model package 110. Column 172c is added for the hierarchical policy of Table 4 managed by the hierarchical security model package 120. In some embodiments, the security manager 132 forms an additional data structure that associates each of one or more tables of the database 150 with one or more policies of the database policy set. In some embodiments, the security manager 132 associates each of one or more tables of the database 150 with one or more policies of the database policy set in the data structure for the security labels maps 136.

In step 224, the access mediation routines are invoked by the database security manager 132 of the database server 130 to determine whether to allow an operation on data in the tables of the database. For example, the security manager 132 of the database server 130 invokes access mediation routines 112 of the compartmented security model package 110 to determine whether to allow operation on data in row 162 of table 160 because one or more compartmented policies are associated with the table 160. The security manager 132 of the database server 130 also invokes access mediation routines of the hierarchical security model package 120 to determine whether to allow operation on data in row 162 of table 160 because a hierarchical policy is also associated with the table 160.

Figure 3:
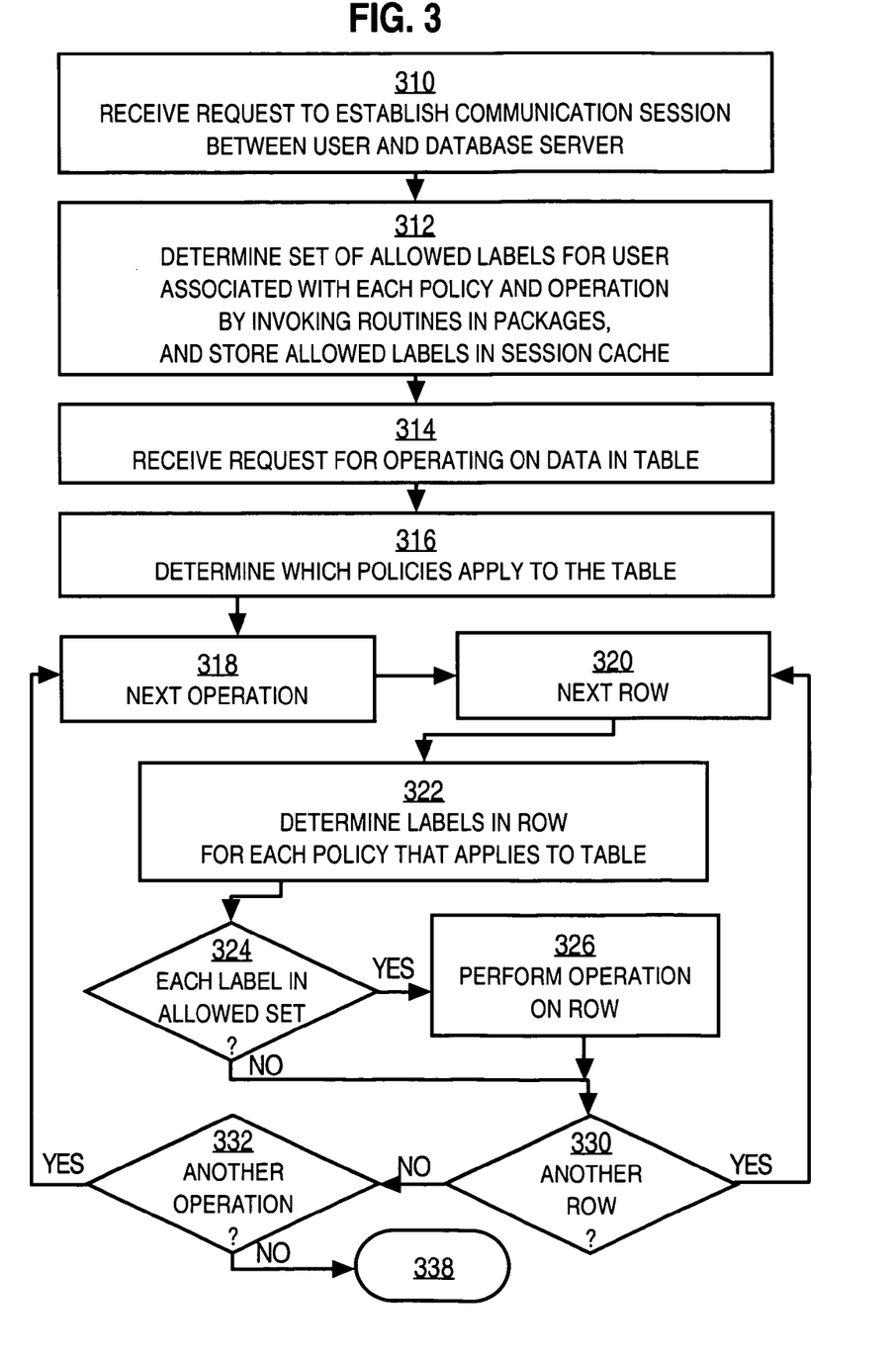
FIG. 3 is a flow chart illustrating details of one step of the method of FIG. 2, according to an embodiment.

FIG. 3 is a flow chart illustrating details of step 224 of the method of FIG. 2, according to an embodiment.

In step 310, the database server receives a request to establish a communication session for a user, either directly from a client process operated by the user or indirectly through an application being operated by a user. For example, the database server 130 receives a request to establish a communication session with application 104 for user 106. The request includes a logon identity for the user 106.

In step 312, the security manager 132 of the database server 130 determines a set of allowed labels based on the logon identity of the user and the access mediation routines for the database policy set. A label for each policy is added to the allowed set if the user is allowed to perform an operation on data having that label in a particular policy. In some embodiments, the labels in the allowed set depend on the operation. For example, in a hierarchical policy, a user may be able to read data having any label below the user's label in a particular line, but only a user with a label matching the label in the data may write or change the data.

According to one embodiment, step 312 includes the following steps by the security manager 132 of the database server 130.

1) The database server retrieves from the security labels maps 136 all the policies in the database policy set and all the labels for each policy in the database policy set.

2) For each policy the database server calls the logon handler of the package that manages the policy. The call is made to determine the user label associated with the user for that policy.

3) For each operation of a set of database operation types and for each label of the policy, the database server invokes an access mediation routine of the package that manages the policy. For example, the set of operation types include INSERT, DELETE, UPDATE, SELECT. The database server passes parameters indicating the name of the policy, the operation type, the user label, and a particular label of the labels for the named policy. The access mediation routine returns data indicating whether to allow that operation type for that user on a row having the particular label for that policy. If the returned data indicates the operation is allowed, data indicating the particular label is added to the allowed set in association with the operation type and the policy. If the returned data indicates the operation is not allowed, data indicating the particular label is not added to the allowed set.

Table 5 lists an example allowed set for the example policy of Table 4, using the database coded labels to indicate the labels of this policy. A different operation type is listed in each column. It is assumed the user has the database coded label "7" corresponding to the descriptive label "Corporate, Division A, Dover." According to Table 5, the user having label "7" may insert, update and delete only rows also associated with the label "7" for the security policy of Table 4. The user may, however, select data associated with the labels "7", "8", "9", "10", which are lower on the hierarchy, for the security policy of Table 4.

TABLE 5

Example Allowed Set For Hierarchical Example Policy of TABLE 4.

| INSERT | UPDATE | DELETE | SELECT |
|--------|--------|--------|--------|
| 7 | 7 | 7 | 7 |
|   |   |   | 8 |
|   |   |   | 9 |
|   |   |   | 10 |

In some embodiments, the allowed set is stored in a session cache for the duration of the communication session. In some embodiments, only the user labels associated with the user for all the policies in the database policy set are determined in step 312 and stored in the session cache.

In other embodiments, step 312 is omitted and an allowed set is not formed. The logon identity of the user is retrieved when needed from a session data structure maintained by the database server in any manner known in the art.

In step 314 the database server receives a request to perform a set of operations on data in a table of the database. For example, a request is received to select data in row 162 of table 160. It is assumed that the data in row 162 belongs in "Compartment H" according to the policy of Table 1, belongs in compartment "Alpha" according to the policy of Table 2, and is at the "Corporate, Division A, Dover, Sales" node according to the policy of Table 4. Thus, row 162 has values in label fields 184a, 184b, 184c of "8", "1", "10", respectively, using the database coded labels.

In step 316 it is determined which policies of the database set apply to the table being operated on. For example, it is determined that the policies of Table 1, Table 2 and Table 4 apply to table 160. This can be determined in any manner. For example, in one embodiment the database manager 132 of database server 130 may determine that the column names in the data dictionary 152 for these three columns match policy names and that the data types for these three columns are all a security label type. In another embodiment, the database manager determines that certain policies apply based on data in a separate data structure or data in the security labels maps. The set of one or more policies of the database policy set that apply to a particular table is herein called a table policy set.

In step 318 the next operation is mediated, starting with the first operation. For example the operation to select is made the next operation to mediate. In step 320 the operation on the next row is mediated, starting with the first row. For example the selection of row 162 is mediated.

In step 322 the labels associated with the row for the table policy set are determined. For example the values in fields 184a, 84b, 184c are determined to be "8", "1", "10", respectively. In other embodiments the labels associated with the row are not stored in fields in the row but are stored in another data structure, such as one or more rows in another table, that is associated with row 162.

In step 324, it is determined whether each label is in the allowed set. In the illustrated embodiment, step 324 is accomplished by the security manager 132 of the database server checking the values, "8", "1", "10" associated with the row, against values in the allowed set. For example, the value "10" is the label for the policy of Table 4. The allowed set for this user and this policy is given in Table 5. As can be seen in Table 5, the allowed set for the SELECT operation type includes "10". Therefore the user is allowed to select row 162 according to the policy of Table 4. Similar steps are taken to see whether the user is allowed to select row 162 according to the policies of Table 1 and Table 2.

In embodiments that do not determine a complete allowed set, step 324 is accomplished by invoking the access mediation routine for each policy in the table policy set. For example, in one embodiment, an access mediation routine of package 110 is invoked, passing as parameters the policy name for the policy of Table 1, the user label for the policy of Table 1, and data indicating the operation "SELECT." If the user labels are also not determined and stored in the session cache, such as when step 312 is omitted, then the logon identity for the user is obtained from the session cache, and the logon handler of the first package is invoked to determine the user label for the policy of Table 1.

According to this example, the access mediation routine of package 110 is invoked again, passing as parameters the policy name for the policy of Table 2, the user label for the policy of Table 2, and data indicating the operation "SELECT." The access mediation routine of package 120 is also invoked, passing as parameters the policy name for the policy of Table 4, the user label for the policy of Table 4, and data indicating the operation "SELECT."

In another embodiment, a different access mediation routine can be invoked for each operation. For example, a select mediation routine is invoked for select operations and an insert mediation routine is invoked for operations involving an insert. The names and parameters of the access mediation routines are specified in the specified programming interface described above.

If each label is in the allowed set, then control passes to step 326 to perform the operation on the row. If one of the labels is not allowed, then step 326 is skipped and control passes to step 330 to mediate the next row. For example, if the user having user label corresponding to database coded label "7" for the policy of Table 4 also has user labels corresponding to database coded labels "8" and "1" for the policies of Table 1 and Table 2, respectively, then each label is in the allowed set and control passes to step 326. That is, a user whose logon identify is associated with "Compartment H" in the policy of Table 1, compartment "Alpha" in the policy of Table 2, and "Corporate, Division A, Dover" in the policy of Table 4 is allowed to select row 162. This is true regardless of the label associated with the user in the policy of Table 3, which does not apply to table 160.

Step 330 represents a decision point at which it is determined whether another row is the object of the operation being mediated. If so, control returns to step 320 to mediate the next row of the operation. If not, control passes to step 332. Step 332 represents a decision point at which it is determined whether another operation is being mediated. If so, control returns to step 318 to mediate the next operation. If not, control passes to step 338. In step 338 the processing of the request received in step 314 is complete.

In some embodiments steps 320, 322, 324, 326, 330 are accomplished by inserting a WHERE clause in a database query to perform the operation. The WHERE clause prevents the operation unless conditions specified in the WHERE clause are satisfied. In some embodiments, the conditions for the WHERE clause are returned by the access mediation routines of the security model packages. In some embodiments the conditions for the WHERE clause are constructed by the security manager 132 of the database server 130 based on the labels in the row and the labels in the allowed set.

These techniques allow several policies to be applied simultaneously to the same row in a database table, and provide a pluggable module in the form of the database package that allows one or more access control security policies to be added to a common database server.

In some embodiments, the packages are registered, policies are created, and policies are applied to tables in the database without taking the database server 130 off line.

Hardware Overview

Figure 4:
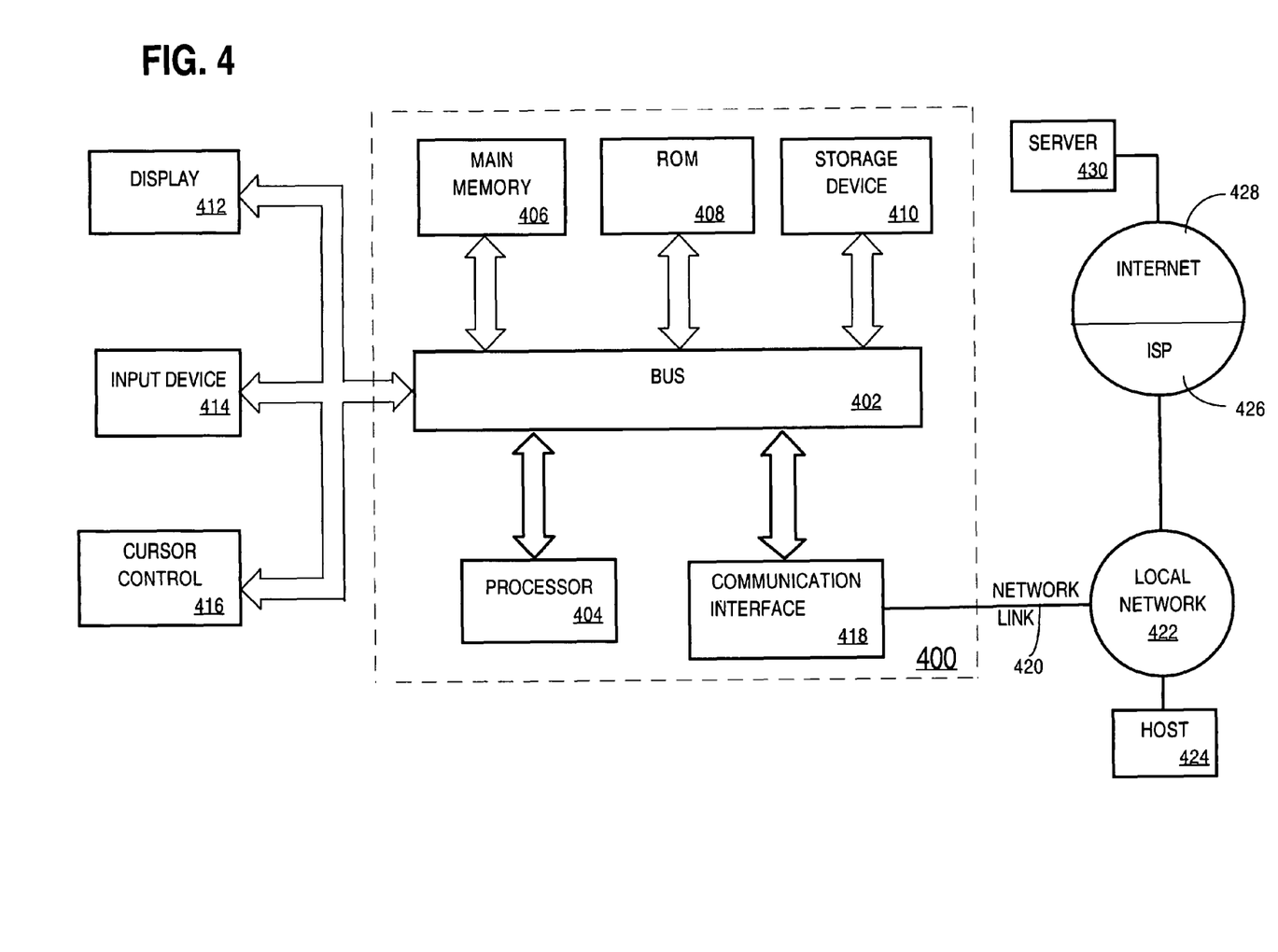
FIG. 4 is a block diagram of a computer system on which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing access to data in a database subject to a plurality of label-based security policies, the method comprising the steps of:
   receiving, a request for performing an operation set of one or more operations on data in a table of the database;
   determining which policies, of the plurality of label-based security policies, apply to the table based on a policy set of one or more policies associated with the table;
   for each operation in the operation set, determining whether to perform the operation on a row of the table based on a set of labels associated with the row, the set of labels corresponding to the policy set;
   adding, to the table, a first policy column that stores labels for a first policy of the policy set that has a first policy type that is selected from the group consisting of: (a) a compartmented policy type in which a label associated with a particular row must exactly match a subject's label in order for the subject to gain access to the particular row, (b) a multi-level policy type in which a label associated with the particular row must be at a same or lower level of security than a level of security associated with the subject in order for the subject to gain access to the particular row, and (c) a hierarchical policy type in which a label associated with the particular row must be at a same level of security associated with the subject or at a lower level on a same branch of a hierarchy that contains the level of security associated with the subject in order for the subject to gain access to the particular row; and adding, to the table, a second policy column that stores labels for a second policy of the policy set that has a second policy type that is selected from the group;

wherein the first policy type differs from the second policy type; and wherein the method is executed by a database management system comprising one or more computer systems.

2. A method according to claim 1, further comprising adding a policy column to the table for each policy in the policy set associated with the table.

3. A method according to claim 2, further comprising storing a label, of the set of labels associated with the row, in a corresponding policy column of the row.

4. A method according to claim 2, said step of determining which policies apply further comprising the step of determining whether a column is a policy column.

5. A method according to claim 1, wherein the policy set associated with the table includes two or more policies of the plurality of label-based security policies.

6. A non-transitory computer-readable storage medium storing one or more sequences of instructions for managing access to data in a database subject to a plurality of label-based security policies, wherein execution of the one or more sequences of instructions by one or more processors causes the one or more processors to perform the steps of:

receiving a request for performing an operation set of one or more operations on data in a table of the database;

determining which policies, of the plurality of label-based security policies, apply to the table based on a policy set of one or more policies associated with the table;

for each operation in the operation set, determining whether to perform the operation on a row of the table based on a set of labels associated with the row, the set of labels corresponding to the policy set;

adding, to the table, a first policy column that stores labels for a first policy of the policy set that has a first policy type that is selected from the group consisting of: (a) a compartmented policy type in which a label associated with a particular row must exactly match a subject's label in order for the subject to gain access to the particular row, (b) a multi-level policy type in which a label associated with the particular row must be at a same or lower level of security than a level of security associated with the subject in order for the subject to gain access to the particular row, and (c) a hierarchical policy type in which a label associated with the particular row must be at a same level of security associated with the subject or at a lower level on a same branch of a hierarchy that contains the level of security associated with the subject in order for the subject to gain access to the particular row;

adding, to the table, a second policy column that stores labels for a second policy of the policy set that has a second policy type that is selected from the group; and wherein the first policy type differs from the second policy type.

7. The non-transitory computer-readable storage medium according to claim 1, wherein execution of the one or more sequences of instructions further causes the one or more processors to perform the step of adding a policy column to the table for each policy in the policy set associated with the table.

8. The non-transitory computer-readable storage medium according to claim 7, wherein execution of the one or more sequences of instructions further causes the one or more processors to perform the step of storing a label, of the set of labels associated with the row, in a corresponding policy column of the row.

9. The non-transitory computer-readable storage medium according to claim 7, said step of determining which policies apply further comprising the step of determining whether a column is a policy column.

10. The non-transitory computer-readable storage medium according to claim 6, wherein the policy set associated with the table includes two or more policies of the plurality of label-based security policies.

* * * * *

UNITED STATES PATENT AND TRADEMARK OFFICE
CERTIFICATE OF CORRECTION

| | | |
|---|---|---|
| PATENT NO. | : 8,316,051 B1 | Page 1 of 1 |
| APPLICATION NO. | : 10/006543 | |
| DATED | : November 20, 2012 | |
| INVENTOR(S) | : Rae K. Burns, Patrick F. Sack and Vikram Reddy Pesati | |

It is certified that error appears in the above-identified patent and that said Letters Patent is hereby corrected as shown below:

On page 1, section (73)

delete "Assignee: Oralce International Corporation" and insert -- Assignee: Oracle International Corporation --

Signed and Sealed this

Twenty-second Day of January, 2013

David J. Kappos
*Director of the United States Patent and Trademark Office*